(12) United States Patent
Mizusawa

(10) Patent No.: US 8,284,494 B2
(45) Date of Patent: Oct. 9, 2012

(54) OPTICAL SYSTEM

(75) Inventor: Masayuki Mizusawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 60 days.

(21) Appl. No.: 12/932,320

(22) Filed: Feb. 22, 2011

(65) Prior Publication Data

US 2012/0212832 A1 Aug. 23, 2012

(51) Int. Cl.
*G02B 15/14* (2006.01)

(52) U.S. Cl. ........ 359/680; 359/682; 359/689; 359/726; 359/738; 359/740

(58) Field of Classification Search .................. 359/680, 359/682, 689, 726, 738, 740
See application file for complete search history.

(56) References Cited

U.S. PATENT DOCUMENTS

| | | | | |
|---|---|---|---|---|
| 5,930,055 A | * | 7/1999 | Eisenberg | ...................... 359/728 |
| 7,929,219 B2 | * | 4/2011 | Togino | ........................... 359/736 |
| 2004/0254424 A1 | | 12/2004 | Simkulet et al. | |

FOREIGN PATENT DOCUMENTS

| EP | 1 452 899 | 9/2004 |
|---|---|---|
| JP | 2007-233036 | 9/2007 |
| JP | 2008-309859 | 12/2008 |
| WO | WO 03/042743 | 5/2003 |
| WO | WO 2005/110186 | 11/2005 |
| WO | WO 2010/084915 | 7/2010 |

OTHER PUBLICATIONS

Extended European Search Report, dated Jun. 6, 2011, issued in corresponding European Patent Application No. 11001459.4.

* cited by examiner

*Primary Examiner* — Evelyn A. Lester

(74) *Attorney, Agent, or Firm* — Kenyon & Kenyon LLP

(57) ABSTRACT

An optical system for observation of a front-direction object and a substantially-lateral-direction object includes, in order from the front-direction-object side, a front group with a negative refracting power having a reflecting/refracting optical element, an aperture stop, and a rear group with a positive refracting power having a moving lens component movable along the optical axis. The reflecting/refracting optical element has a first face formed on the front-direction-object side, a second face formed on the image side, and a third face formed as a transmitting surface between the first face and the second face. The first face has a first transmitting surface formed with the optical axis being at a center thereof and a first reflecting surface annularly formed around the first transmitting surface and directed toward an image side. The second face has a second transmitting surface formed with the optical axis being at a center thereof and a second reflecting surface annularly formed around the second transmitting surface and directed toward the front-direction-object side. A movement of the moving lens component changes the refracting power ratio of the front group to the rear group, to enlarge or shrink, in the entire observation region, a region in which an image of the front-direction object is formed.

6 Claims, 18 Drawing Sheets

COMA ON MERIDIONAL PLANE

HALF FIELD ANGLE (60.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (15.00)°

COMA ON MERIDIONAL PLANE

HALF FIELD ANGLE (0.000)°

——————— 656.2700 NM   — — — — — 486.1000 NM
- - - - - - - - 587.5600 NM   — - - — - - — 435.8300 NM
— - - — - - — 546.0700 NM

COMA ON SAGITTAL PLANE

X-FAN

HALF FIELD ANGLE (60.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (15.00)°

COMA ON SAGITTAL PLANE

HALF FIELD ANGLE (0.000)°

———————— 656.2700 NM     – – – – – – 486.1000 NM
- - - - - - - - 587.5600 NM     — - - — - - 435.8300 NM
— - — - — - 546.0700 NM

COMA ON MERIDIONAL PLANE

HALF FIELD ANGLE (115.0)°

COMA ON MERIDIONAL PLANE

HALF FIELD ANGLE (105.0)°

COMA ON MERIDIONAL PLANE

HALF FIELD ANGLE (95.00)°

COMA ON MERIDIONAL PLANE

HALF FIELD ANGLE (85.00)°

COMA ON MERIDIONAL PLANE

HALF FIELD ANGLE (75.00)°

——————— 656.2700 NM      ————————— 486.1000 NM
————————— 587.5600 NM     ——·——·—— 435.8300 NM
——·——·——· 546.0700 NM

COMA ON
SAGITTAL PLANE

HALF FIELD ANGLE
(115.0)°

COMA ON
SAGITTAL PLANE

HALF FIELD ANGLE
(105.0)°

COMA ON
SAGITTAL PLANE

HALF FIELD ANGLE
(95.00)°

COMA ON
SAGITTAL PLANE

HALF FIELD ANGLE
(85.00)°

COMA ON
SAGITTAL PLANE

HALF FIELD ANGLE
(75.00)°

——————— 656.2700 NM    ---------- 486.1000 NM
------------------ 587.5600 NM    —–—–—–— 435.8300 NM
—·—·—·—· 546.0700 NM

COMA ON MERIDIONAL PLANE

HALF FIELD ANGLE (60.00)°

COMA ON MERIDIONAL PLANE

HALF FIELD ANGLE (45.00)°

COMA ON MERIDIONAL PLANE

HALF FIELD ANGLE (30.00)°

COMA ON MERIDIONAL PLANE

HALF FIELD ANGLE (15.00)°

COMA ON MERIDIONAL PLANE

HALF FIELD ANGLE (0.000)°

——————— 656.2700 NM     — — — — — 486.1000 NM
- - - - - - - 587.5600 NM     — - - — - - — 435.8300 NM
— - - — - - — 546.0700 NM

COMA ON SAGITTAL PLANE

X-FAN

HALF FIELD ANGLE (60.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (15.00)°

COMA ON SAGITTAL PLANE

HALF FIELD ANGLE (0.000)°

——————— 656.2700 NM  ————— 486.1000 NM
------------------- 587.5600 NM  —·—··—·— 435.8300 NM
—··—··—··— 546.0700 NM

COMA ON
MERIDIONAL PLANE

HALF FIELD ANGLE (60.00)°

COMA ON
MERIDIONAL PLANE

HALF FIELD ANGLE (45.00)°

COMA ON
MERIDIONAL PLANE

HALF FIELD ANGLE (30.00)°

COMA ON
MERIDIONAL PLANE

HALF FIELD ANGLE (15.00)°

COMA ON
MERIDIONAL PLANE

HALF FIELD ANGLE (0.000)°

——————— 656.2700 NM         ---------- 486.1000 NM
------------------ 587.5600 NM         —··—··— 435.8300 NM
—·—·—·— 546.0700 NM

COMA ON SAGITTAL PLANE

X-FAN

HALF FIELD ANGLE (60.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (15.00)°

COMA ON SAGITTAL PLANE

HALF FIELD ANGLE (0.000)°

——————— 656.2700 NM   ————— 486.1000 NM
----------------- 587.5600 NM   —·—·— 435.8300 NM
—·—·—·— 546.0700 NM

COMA ON
MERIDIONAL PLANE

COMA ON
MERIDIONAL PLANE

COMA ON
MERIDIONAL PLANE

COMA ON
MERIDIONAL PLANE

COMA ON
MERIDIONAL PLANE

———————— 656.2700 NM   ———————— 486.1000 NM
---------- 587.5600 NM   —·—·—·— 435.8300 NM
—··—··— 546.0700 NM

COMA ON SAGITTAL PLANE

X-FAN

HALF FIELD ANGLE (115.0)°

COMA ON SAGITTAL PLANE

HALF FIELD ANGLE (105.0)°

COMA ON SAGITTAL PLANE

HALF FIELD ANGLE (95.00)°

COMA ON SAGITTAL PLANE

HALF FIELD ANGLE (85.00)°

COMA ON SAGITTAL PLANE

HALF FIELD ANGLE (75.00)°

——————— 656.2700 NM     —————— 486.1000 NM
----------------- 587.5600 NM     ————-—— 435.8300 NM
—-—-—-— 546.0700 NM

COMA ON MERIDIONAL PLANE

COMA ON MERIDIONAL PLANE

COMA ON MERIDIONAL PLANE

COMA ON MERIDIONAL PLANE

COMA ON MERIDIONAL PLANE

——————— 656.2700 NM
------------------- 587.5600 NM
——·——·—— 546.0700 NM
-------------- 486.1000 NM
——··——··—— 435.8300 NM

COMA ON SAGITTAL PLANE

HALF FIELD ANGLE (60.00)°

COMA ON SAGITTAL PLANE

HALF FIELD ANGLE (45.00)°

COMA ON SAGITTAL PLANE

HALF FIELD ANGLE (30.00)°

COMA ON SAGITTAL PLANE

HALF FIELD ANGLE (15.00)°

COMA ON SAGITTAL PLANE

HALF FIELD ANGLE (0.000)°

——————— 656.2700 NM      — — — — — 486.1000 NM
-------------- 587.5600 NM      — -- — -- — 435.8300 NM
— - — - — 546.0700 NM

OPTICAL SYSTEM

BACKGROUND OF THE INVENTION

1) Field of the Invention

The present invention relates to an optical system for achieving simultaneous observation of a front-direction object and a substantially-lateral-direction object and close-up enlarged view observation of the front-direction object.

2) Description of the Related Art

Conventionally, there have been known optical systems that make it possible to achieve simultaneous observation of a front-direction object and a substantially-lateral-direction object. Of such optical systems, there have been known to have a configuration in which light from the substantially-lateral-direction-object side is caused to emerge from the image side after being reflected inside the optical system (See Japanese Patent Kokai No. 2008-309859, Japanese Patent Kokai No. 2008-309859). Here, "substantially lateral direction" is defined to include not only a direction right beside the optical system but also a diagonally front direction and a diagonally back direction in reference to the optical system.

SUMMARY OF THE INVENTION

An optical system of the present invention for observation of a front-direction object and a substantially-lateral-direction object includes, in order from the front-direction-object side, a front group with a negative refracting power having a reflecting/refracting optical element, an aperture stop, and a rear group with a positive refracting power having a moving lens component that is movable along the optical axis. The reflecting/refracting optical element has a first face that is formed on the front-direction-object side and that has a first transmitting surface formed with the optical axis being at a center thereof and a first reflecting surface annularly formed around the first transmitting surface and directed toward an image side, a second face that is formed on the image side and that has a second transmitting surface formed with the optical axis being at a center thereof and a second reflecting surface annularly formed around the second transmitting surface and directed toward the front-direction-object side, and a third face formed as a transmitting surface between the first face and the second face. A movement of the moving lens component changes the refracting power ratio of the front group to the rear group, to enlarge or shrink, in the entire observation region, a region in which an image of the front-direction object is formed.

In the optical system of the present invention, it is preferred that the moving lens component has a positive refracting power.

In the optical system of the present invention, it is preferred that, in the rear group, a lens component closest to the aperture stop is the moving lens component.

In the optical system of the present invention, it is preferred that the front group includes a first lens unit with a negative refracting power and a second lens unit and the rear group includes a third lens unit with a positive refracting power, and that the first lens unit, the second lens unit, the aperture stop and the third lens unit form a first optical system for observation of the front-direction object, and the second lens unit, the aperture stop and the third lens unit form a second optical system for observation of the substantially-lateral-direction object.

In the optical system of the present invention, it is preferred that light from the front-direction-object side, after being incident on the first transmitting surface, is made emergent toward the image side from the second transmitting surface and that light from the substantially-lateral-direction-object side, after being incident on the third face, is sequentially reflected at the second reflecting surface and the first reflecting surface and is made emergent toward the image side from the second transmitting surface.

It is preferred that the optical system of the present invention satisfies the following condition:

$$1.05 < f_{r\_c}/f_{r\_w} < 1.45$$

where $f_{r\_w}$ is a focal length of the rear group in the state where simultaneous observation of the front-direction object and the substantially-lateral-direction object is made, and $f_{r\_c}$ is a focal length of the rear group in the state where the region in which an image of the front-direction object is formed in the observation region is enlarged and observed.

According to the present invention, it is possible to provide an optical system that facilitates simultaneous observation of a front-direction object and a substantially-lateral-direction object and close-up enlarged view observation of the front-direction object.

These and other features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
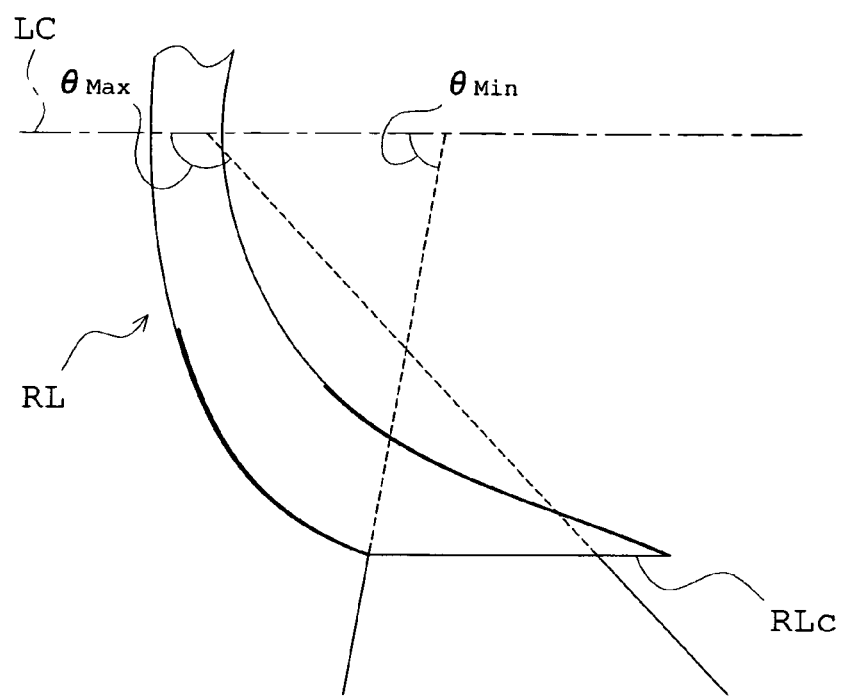
FIG. 1. is a schematic diagram that shows the angle of view with respect to light entering the reflecting/refracting optical element of the present invention as coming from the substantially-lateral-direction-object side.

Preceding explanations of the embodiments of optical systems according to the present invention, function and effect of the configuration of the present invention is explained.

The optical system of the present invention is provided with a reflecting/refracting optical element having a first face that is formed on the front-direction-object side and that has a first transmitting surface formed with an optical axis being at the center thereof and a first reflecting surface annularly formed around the first transmitting surface and directed toward the image side, a second face that is formed on the image side and that has a second transmitting surface formed with the optical axis being at the center thereof and a second reflecting surface annularly formed around the second transmitting surface and directed toward the front-direction-object side, and a third face formed as a transmitting surface between the first face and the second face.

In this way, since the optical system of the present invention is provided with the reflecting/refracting optical element, it is possible to achieve simultaneous observation of a front-direction object and a substantially-lateral-direction object. Here, the term "reflecting/refracting optical element" means a member that uses the reflecting function and the refracting function of light.

The optical system of the present invention for observation of a front-direction object and a substantially-lateral-direction object includes, in order from the front-direction-object side, a front group with a negative refracting power having a reflecting/refracting optical element, an aperture stop, and a rear group with a positive refracting power having a moving lens component that is movable in a direction along the optical axis, wherein a movement of the moving lens component changes the refracting power ratio of the front group to the rear group and accordingly enlarges or shrinks, in the entire observation region, a region in which an image of the front-direction object is formed.

In this way, the optical system of the present invention is constructed as a retrofocus optical system with respect to light coming from the front-direction-object side.

In a retrofocus optical system, in general, when the negative refracting power of the front group and the positive refracting power of the rear group change, the focal length is changed and, at the same time, the image on the image surface is enlarged or shrunk. Thus, in the optical system of the present invention also, which is constructed as a retrofocus optical system with respect to light coming from the front-direction-object side to enter it, when the moving lens component included in the rear group is moved along the optical axis, the focal length is changed and, at the same time, the region in which the image of the front-direction object is formed is enlarged or shrunk in the entire observation region, because the refracting power ratio of the front group to the rear group is changed.

That is, the optical system of the present invention is configured to be changeable from an optical system optimized for simultaneous observation of a front-direction object and a substantially-lateral-direction object to an optical system optimized for close-up enlarged view observation of the front-direction object, only by movement the moving lens component in a direction along the optical axis.

In the optical system of the present invention, it is preferred that the moving lens component has a positive refracting power. In the configuration where the moving lens component included in the rear group has a positive refracting power, it is possible to weaken the negative refracting power of the front group and the positive refracting power of the rear group relative to each other by moving the moving lens component toward the object side. In addition, since the rear group has a positive refracting power as a whole, configuring the moving lens component included in the rear group to have a positive refracting power makes it possible to save the number of lens elements.

In the optical system of the present invention, it is preferred that, in the rear group, a lens component closest to the aperture stop is the moving lens component. That the lens component closest to the aperture stop in the rear group is the moving lens component means that the moving lens component is close to the front group also. In a configuration where a moving lens component is arranged in such a position, the front group is easily affected by movement of the moving lens component and thus the negative refracting power of the front group also is easily changed. That is, the refracting power of the front lens is sufficiently changeable without a large shift of the moving lens component.

It is preferred that the optical system of the present invention satisfies the following condition:

$$1.05 < f_{r\_c}/f_{r\_w} < 1.45$$

where $f_{r\_w}$ is a focal length of the rear group in the state where simultaneous observation of the front-direction object and the substantially-lateral-direction object is made, and $f_{r\_c}$ is a focal length of the rear group in the state where the region in which an image of the front-direction object is formed in the observation region is enlarged and observed.

If the lower limit of this condition "$1.05 < f_{r\_c}/f_{r\_w} < 1.45$" is not reached, the variation of the focal length of the rear group between the state for simultaneous observation of the front-direction object and the substantially-lateral-direction object and the state for close-up enlarged view observation of the front-direction object is too small to appropriately achieve these observation states. On the other hand, if the upper limit is exceeded, the variation of the focal length is too large to keep a good balance between various aberrations.

In reference to the drawings, optical systems according to Embodiment 1 and Embodiment 2 are explained below.

The numerical subscripts in $r_1, r_2, \ldots$ and $d_1, d_2, \ldots$ shown in the sectional views of the optical systems correspond to the surface numbers 1, 2, . . . of the numerical data.

In the numerical data, s denotes surface numbers, r denotes radii of curvature of surfaces, d denotes surface separations, nd denotes refractive indices for d-line rays (wavelength of 587.56 nm), vd denotes Abbe's numbers for d-line rays, k denotes conic constants, and $A_4$, $A_6$, $A_8$ and $A_n$ denote aspherical coefficients.

Regarding the aspherical coefficients in the numerical data, E denotes a power of ten. For example, "E-01" means ten to the negative first power. The shape of each aspherical surface is expressed by the following expression using the aspherical coefficients shown in the numerical data:

$$Z = (Y^2/r)/[1 + \{1-(1+k)\cdot(Y/r^2)\}^{1/2}] + A_4 Y^4 + A_6 Y^6 + A_8 Y^8 + A_{10} Y^{10} + \ldots$$

where a coordinate in the direction along the optical axis is represented by Z, and a coordinate in a direction perpendicular to the optical axis is represented by Y.

In the aberration diagrams, the meridional plane is defined as a plane that contains the optical axis of the optical system and a chief ray (a plane parallel to the drawing sheet), and the sagittal plane is defined as a plane that contains the optical axis and is perpendicular to the meridional plane (a plane perpendicular to the drawing sheet). Since the optical system of the present invention is symmetrical with respect to the meridional plane, plotting of quantity of aberration on the sagittal plane is omitted in the negative domain of the horizontal axis. In each diagram showing coma, the vertical axis represents quantity of aberration, and the horizontal axis represents aperture ratio (−1 to 1). Wavelengths corresponding to the respective lines are indicated in the drawing sheets. For example, the wavelength corresponding to the solid line is 656.27 nm.

In reference to FIG. 1, an explanation is made of the definition of angle of view with respect to light entering the reflecting/refracting optical element of the optical system of the present invention as coming from the substantially-lateral-direction-object side. FIG. 1 is a schematic diagram that shows the angle of view with respect to light entering the reflecting/refracting optical element of the present invention as coming from the substantially-lateral-direction-object side.

An angle formed, on the front-direction-object side, between a chief ray of light incident on the third face $RL_c$ of the reflecting/refracting optical element RL and the optical axis LC is defined as a half-field angle for the substantially-lateral-direction-object side of the reflecting/refracting optical element RL.

In the case of such a reflecting/refracting optical element RL, a front-direction object, or an object placed on the optical axis LC cannot be observed via the third face $RL_c$. Therefore, the angle of view should include a minimum angle of view $\theta_{Min}$ and a maximum angle of view $\theta_{Max}$. The minimum angle of view $\theta_{Min}$ is an angle formed between the most front-direction-object-side chief ray, in a range observable via the third face $RL_c$, and the optical axis. On the other hand, the maximum angle of view $\theta_{Max}$ is an angle formed between the most image-side chief ray, in the range observable via the third face $RL_c$, and the optical axis.

Embodiment 1

In reference to FIG. 2 through FIG. 8, detailed explanations are made of an optical system according to Embodiment 1.

Figure 2A:
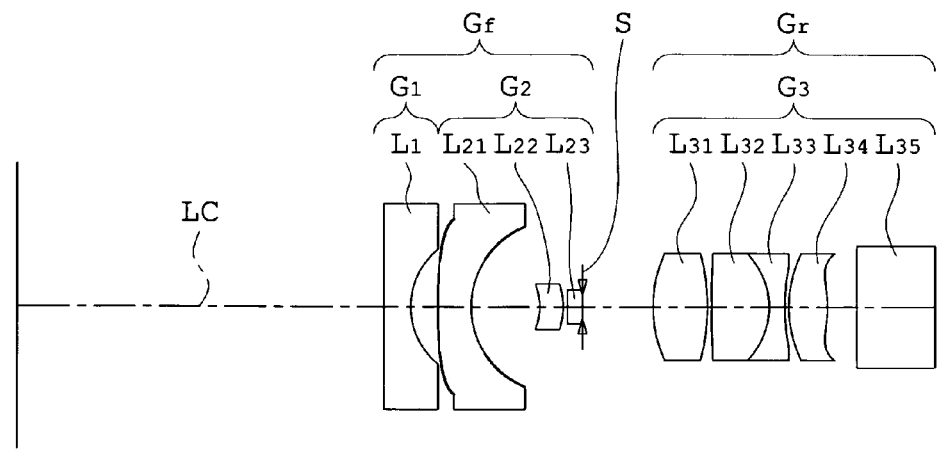
FIGS. 2A and 2B are sectional views taken along the optical axis that show the configuration of the optical system according to Embodiment 1, in a state where simultaneous observation of a front-direction object and a substantially-lateral-direction object is made and in a state where close-up enlarged view observation of the front-direction object is made, respectively.
Figure 2B:
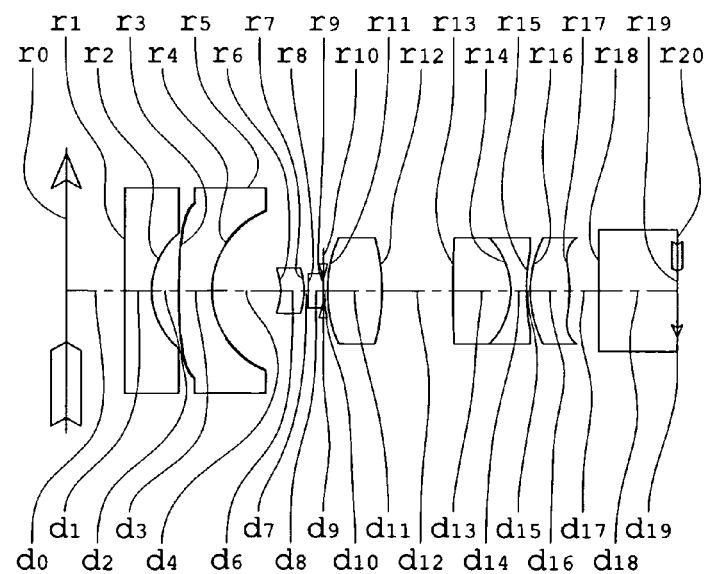
Figure 3A:
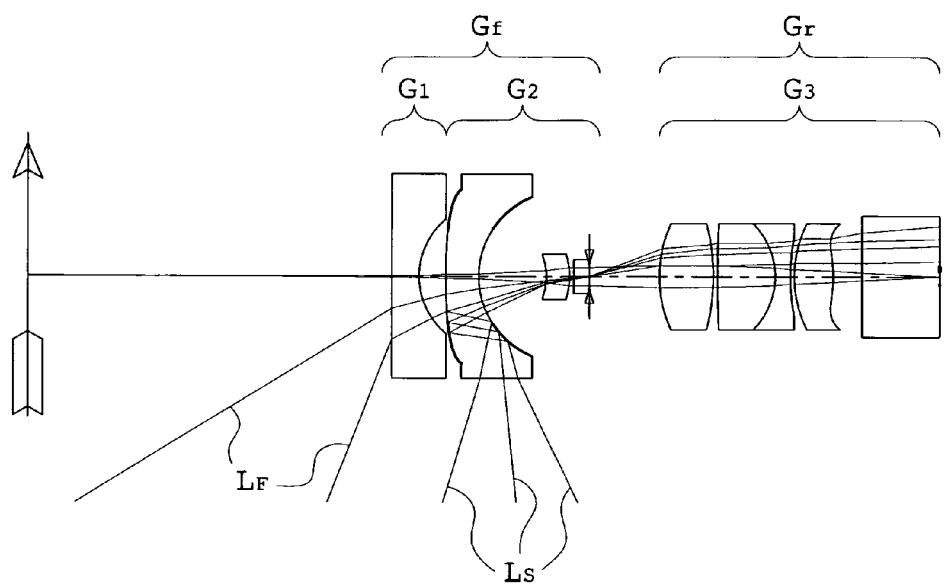
FIGS. 3A and 3B are sectional views taken along the optical axis that show the configuration and path of rays of the optical system according to Embodiment 1, in the state where simultaneous observation of the front-direction object and the substantially-lateral-direction object is made and in the state where close-up enlarged view observation of the front-direction object is made, respectively.
Figure 3B:
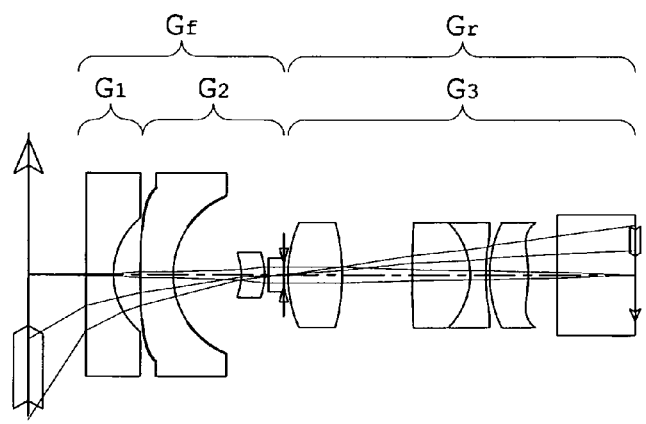

First, the configuration of the optical system of this embodiment is explained in reference to FIG. 2 and FIG. 3.

In the optical system of this embodiment, a front group $G_f$ having a negative refracting power as a whole, an aperture stop S, and a rear group $G_r$ having a positive refracting power as a whole are arranged on an optical axis LC of light from the front-direction-object side, in order from the front-direction-object side.

The front group $G_f$ is composed of, in order from the front-direction-object side, a first lens unit $G_1$ and a second lens unit $G_2$.

The rear group $G_r$ is composed of a third lens unit $G_3$.

The first lens unit $G_1$ is composed of a lens $L_1$ that is a plano-concave lens with the concave surface thereof being directed toward the image side.

The second lens unit $G_2$ includes, in order from the front-direction-object side, a lens $L_{21}$ that is a reflecting/refracting optical element with the front-direction-object-side surface thereof being aspherical, a lens $L_{22}$ that is a negative meniscus lens with the convex surface thereof being directed toward the image side, and a lens $L_{23}$ that is a planar lens.

The aperture stop S is arranged on the image-side surface of the lens $L_{23}$ integrally with the lens $L_{23}$.

The third lens unit $G_3$ includes, in order from the front-direction-object side, a lens $L_{31}$ that is a biconvex lens movable along the optical axis, a lens $L_{32}$ that is a biconvex lens, a lens $L_{33}$ that is a biconcave lens, a lens $L_{34}$ that is a biconvex lens with the image-side surface thereof being aspherical, and a lens $L_{35}$ that is a planar lens. The image-side surface of the lens $L_{32}$ and the object-side surface of the lens $L_{33}$ are cemented together.

The shapes of the lenses as referred to are those in the neighborhood of the optical axis of light from the front-direction-object side.

Figure 4:
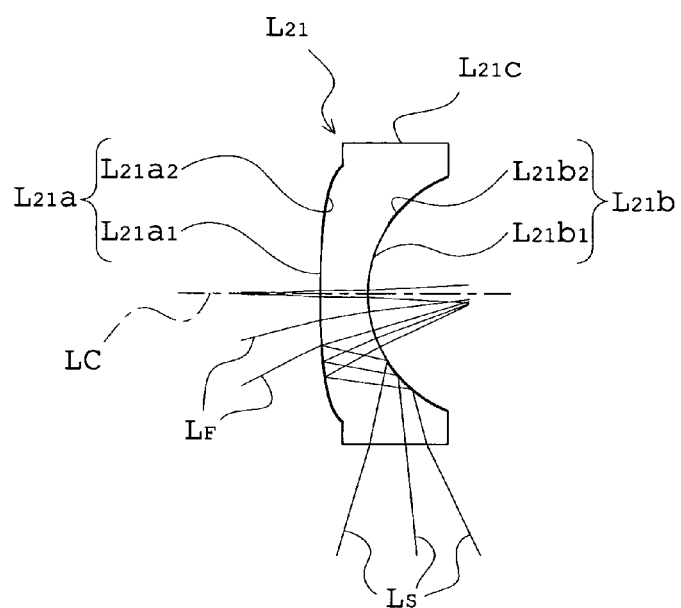
FIG. 4 is an enlarged diagram of the reflecting/refracting optical element included in the optical system according to Embodiment 1.

In reference to FIG. 4, detailed explanations are made of the reflecting/refracting optical system provided for simultaneous observation of a front-direction object and a substantially-lateral-direction object.

The lens $L_{21}$ as a reflecting/refracting optical element has a first face $L_{21}a$ formed on the front-direction-object side, a second face $L_{21}b$ formed on the image side, and a third face $L_{21}c$ formed on the full circumferential surface between the first face $L_{21}a$ and the second face $L_{21}b$.

The first face $L_{21}a$ has a first transmitting surface $L_{21}a_1$ formed with the optical axis being at the center thereof and a first reflecting surface $L_{21}a_2$ directed toward the image side and annularly formed around the first transmitting surface $L_{21}a_1$. The second face $L_{21}b$ has a second transmitting surface $L_{21}b_1$ formed with the optical axis being at the center thereof and a second reflecting surface $L_{21}b_2$ directed toward the front-direction-object side and annularly formed around the second transmitting surface $L_{21}b_1$. The third face $L_{21}c$ is formed as a transmitting surface over its entire area.

The first reflecting surface $L_{21}a_2$ and the second reflecting surface $L_{21}b_2$ are made by deposition. To be specific, for example, upon the first transmitting surface $L_{21}a_1$ being masked with a mask having the same contour as the first transmitting surface $L_{21}a_1$, the entire first face $L_{21}a$ is treated with mirror coating and then the mask is removed. By such a method, since the masked portion remains untreated with mirror coating, the first transmitting surface $L_{21}a_1$ can still be used as a transmitting surface even after the first reflecting surface $L_{21}b_2$ is formed.

In reference to FIG. 3 and FIG. 4, explanations are made of paths followed by light entering the optical system of this embodiment.

Light $L_f$ entering the optical system of this embodiment from the front-direction-object side first passes the lens $L_1$. Then, the light $L_f$ having passed the lens $L_1$ is incident on the first transmitting surface $L_{21}a_1$ of the lens $L_{21}$. Then, the light $L_f$ having been incident on the first transmitting surface $L_{21}a_1$ is emergent from the second transmitting surface $L_{21}b_1$ of the lens $L_{21}$. The light $L_f$ having being emergent from the second transmitting surface $L_{21}b_1$ passes the lens $L_{22}$, the lens $L_{23}$, the aperture stop S and the lenses $L_{31}$ through $L_{35}$ in this order, to form an image of the front-direction object at a center position of an observation region on the image surface.

On the other hand, light $L_s$ entering the optical system of this embodiment from the substantially-lateral-direction-object side is first incident on the third face $L_{21}c$ of the lens $L_{21}$. The light $L_s$ having been incident on the third face $L_{21}c$ is reflected at the second reflecting surface $L_{21}b_2$ of the lens $L_{21}$. Then, the light $L_s$ having been reflected at the second reflecting surface $L_{21}b_2$ is reflected at the first reflecting surface $L_{21}b_2$ of the lens $L_{21}$. Then, the light $L_s$ having been reflected at the first reflecting surface $L_{21}a_2$ is emergent from the second transmitting surface $L_{21}b_1$ of the lens $L_{21}$. The light $L_s$ having been emergent from the second transmitting surface $L_{21}b_1$ passes the lens $L_{22}$, the lens $L_{23}$, the aperture stop S and the lenses $L_{31}$ through $L_{35}$ in this order, to form an image of the substantially-lateral-direction object annularly around the image of the front-direction object that is formed at the center position of the observation region on the image surface.

In reference to FIGS. 3 and FIGS. 5, explanations are made of the change of the optical system of this embodiment from the state optimized for simultaneous observation of a front-direction object and a substantially-lateral-direction object to the state optimized for close-up enlarged view observation of the front-direction object, and images formed in the observation region in the respective states.

Figures 5A, 5B:
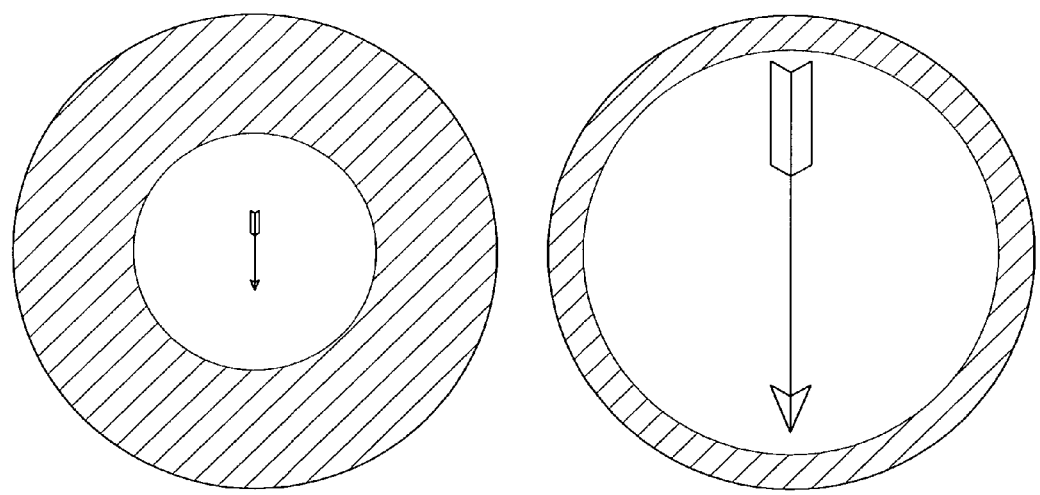
FIGS. 5A and 5B are schematic diagrams that show the observation region for the front-direction object and the observation region for the substantially-lateral-direction object in the entire observation region, in the state where simultaneous observation of the front-direction object and the substantially-lateral-direction object is made and in the state where close-up enlarged view observation of the front-direction object is made, respectively.
Figure 6A:
FIGS. 6A-6E and FIGS. 6F-6J are aberration diagrams of the optical system of Embodiment 1 in the state where simultaneous observation of the front-direction object and the substantially-lateral-direction object is made, for rays travelling from the front-direction-object side toward the image pickup surface, specifically showing coma on the meridional plane at the half-field angles of 60°, 45°, 30°, 15° and 0°, and coma on the sagittal plane at the half-field angles of 60°, 45°, 30°, 15° and 0°, respectively.
Figure 6B:
Figure 6C:
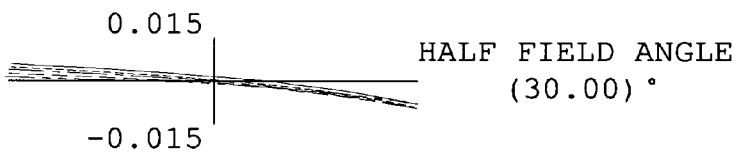
Figure 6D:
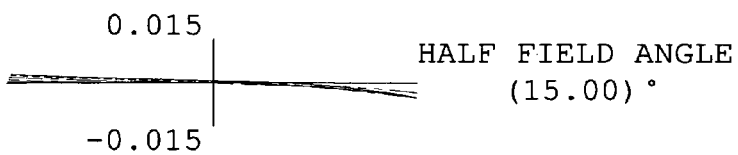
Figure 6E:
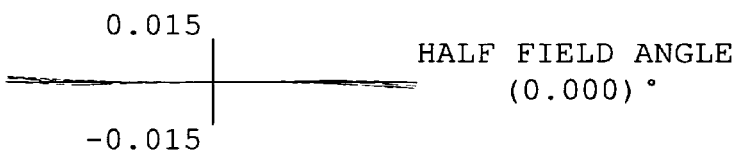
Figure 6F:
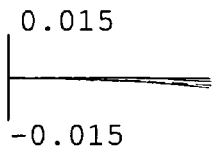
Figure 6G:
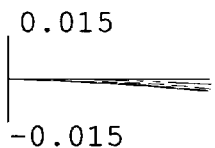
Figure 6H:
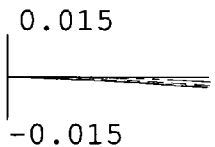
Figure 6I:
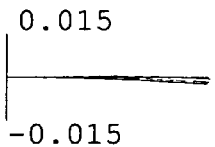
Figure 6J:
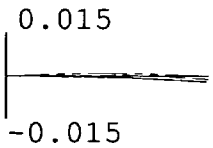
Figure 7A:
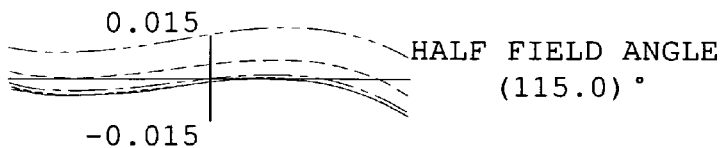
FIGS. 7A-7E and FIGS. 7F-7J are aberration diagrams of the optical system of Embodiment 1 in the state where simultaneous observation of the front-direction object and the substantially-lateral-direction object is made, for rays travelling from the substantially-lateral-direction-object side toward the image pickup surface, specifically showing coma on the meridional plane at the half-field angles of 115°, 105°, 95°, 85° and 75°, and coma on the sagittal plane at the half-field angles of 115°, 105°, 95°, 85° and 75°, respectively.
Figure 7B:
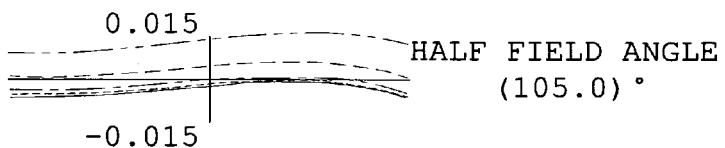
Figure 7C:
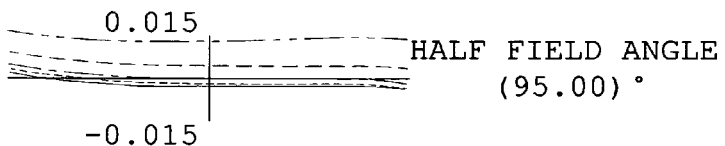
Figure 7D:
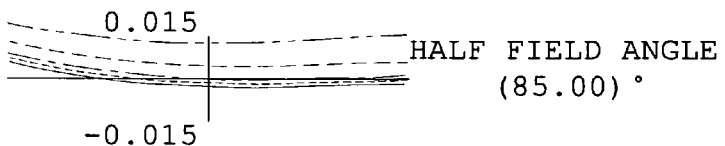
Figure 7E:
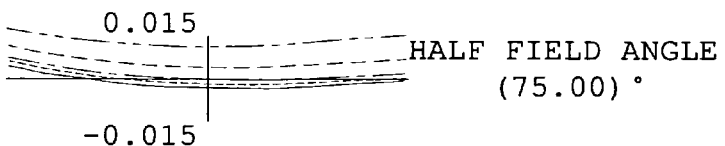
Figure 7F:
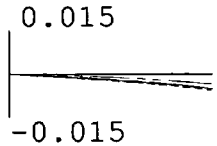
Figure 7G:
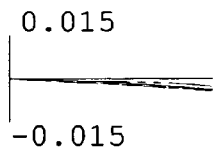
Figure 7H:
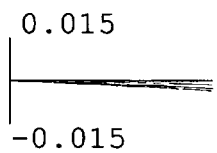
Figure 7I:
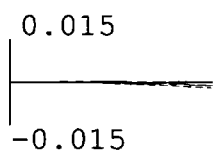
Figure 7J:
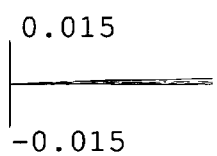
Figure 8A:
FIGS. 8A-8E and FIGS. 8F-8J are aberration diagrams of the optical system of Embodiment 1 in the state close-up enlarged view observation of the front-direction object is made, for rays travelling from the front-direction-object side toward the image pickup surface, specifically showing coma on the meridional plane at the half-field angles of 60°, 45°, 30°, 15° and 0°, and coma on the sagittal plane at the half-field angles of 60°, 45°, 30°, 15° and 0°, respectively.
Figure 8B:
Figure 8C:
Figure 8D:
Figure 8E:
Figure 8F:
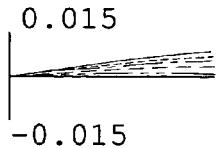
Figure 8G:
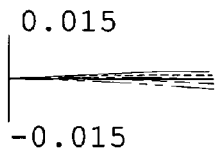
Figure 8H:
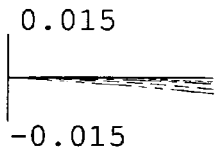
Figure 8I:
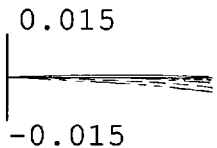
Figure 8J:
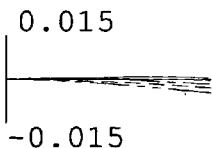

In the state where simultaneous observation of the front-direction object and the substantially-lateral-direction object is made (See FIG. 3A), an image of the front-direction object is formed in the central region and an image of the substantially-lateral-direction object is formed in the annular region around the central region (the region indicated by the hatching in FIG. 5A), in the entire observation region (See FIG. 5A).

The optical system of the present invention is constructed as a retrofocus optical system with respect to light coming from the front-direction-object side. Therefore, when the negative refracting power of the front group $G_f$ and the positive refracting power of the rear group $G_r$ come to be weaker relative to each other than in the state where simultaneous observation of the front-direction object and the substantially-lateral-direction object is made, the region in which the image of the front-direction object is formed is enlarged in the entire observation region, which means that the optical system is brought into the state optimized for close-up enlarged view observation for the front-direction object (See FIG. 5B).

The configuration and numerical data are shown below regarding lenses constituting the optical system according to this embodiment.

Numerical data 1
unit: mm

Surface data

| surface number s | | radius of curvature r | surface separation d | refractive index nd | Abbe's number vd |
|---|---|---|---|---|---|
| 0 | (object surface) | | D0 | | |
| 1 | | ∞ | 0.7 | 1.8830 | 40.8 |
| 2 | | 1.98645 | 0.7 | | |
| 3 | (aspherical surface) | −17.75837 | 0.85 | 1.5163 | 64.1 |
| 4 | | 2.26757 | 1.787 | | |
| 5 | | 2.7 | 2.7 | | |
| 6 | | −1.56527 | 0.6 | 1.8830 | 40.8 |
| 7 | | −1.9108 | 0.1 | | |
| 8 | | ∞ | 0.4 | 1.5163 | 64.1 |
| 9 | | ∞ | 0 | | |
| 10 | (aperture stop) | ∞ | D10 | | |
| 11 | | 3.49907 | 1.4 | 1.7725 | 49.6 |
| 12 | | −5.5374 | D12 | | |
| 13 | | 24.49464 | 1.5 | 1.7292 | 54.7 |
| 14 | | −2.00692 | 0.4 | 1.8467 | 23.8 |
| 15 | | 5.58093 | 0.1 | | |
| 16 | | 3.18186 | 1 | 1.5163 | 64.1 |
| 17 | (aspherical surface) | −5.08989 | 0.75 | | |
| 18 | | ∞ | 2 | 1.5163 | 64.1 |
| 19 | | ∞ | 0 | | |
| 20 | (image surface) | | | | |

It is noted that the radius of curvature for the surface number 5 is a radius of curvature of the third face $L_{21}c$ of the lens $L_{21}$, that is, the cylindrical surface around the optical axis, and the surface separation for the surface number 5 is a distance from the optical axis to the surface number 5.

| | | | Aspherical data | | | |
|---|---|---|---|---|---|---|
| surface number | radius of curvature | conic constant | aspherical coefficients | | | |
| s | r | k | $A_4$ | $A_6$ | $A_8$ | $A_{10}$ |
| 3 | −17.75837 | 0 | 3.21E−02 | −4.74E−03 | −5.46E−05 | 8.59E−05 |
| 17 | −5.06969 | 0 | 2.15E−02 | 3.34E−02 | 6.86E−03 | −1.45E−03 |

Various data

F number: 6.9
entire lens length: 14.2 mm
back focal distance: 0 mm
image height: 1.3 mm

| surface separation | | |
|---|---|---|
| | simultaneous observation | close-up enlarged view observation |
| D0 | 9.440 | 1.505 |
| D10 | 1.814 | 0.1 |
| D12 | 0.1 | 1.814 | moving distance of moving lens component $L_{31}$: 1.741 mm
half-field angle
for front-direction-object side
   common to simultaneous observation mode and
   close-up enlarged view observation mode: 69°
for substantially-lateral-direction-object side (minimum angle~maximum angle)
   simultaneous observation mode: 74°~116°
   close-up enlarged view observation mode: not measurable
focal length
focal length of entire system for front-direction-object side
   simultaneous observation mode: 0.965 mm
   close-up enlarged view observation mode: 1.15746 mm
focal length of first lens unit $G_1$
   common to simultaneous observation mode and
   close-up enlarged view observation mode: −2.237 mm
focal length of second lens unit $G_2$ for front-direction-object side
   common to simultaneous observation mode and
   close-up enlarged view observation mode: −3.988 mm
composite focal length of first lens unit $G_1$ and second lens unit
   common to simultaneous observation mode and
   close-up enlarged view observation mode: −1.281 mm
focal length of third lens unit $G_3$
   simultaneous observation mode ($f_{r\_w}$): 2.874 mm
   close-up enlarged view observation mode ($f_{r\_c}$): 3.3551 mm
focal length of moving lens component $L_{31}$ ($f_m$)
   common to simultaneous observation mode and
   close-up enlarged view observation mode: 2.963 mm
Data Regarding Numerical Condition $f_{r\_c}/f_{r\_w}=1.166$ Embodiment 2

In reference to FIG. 9 through FIG. 13, detailed explanations are made of an optical system according to Embodiment 2. Shape of the reflecting/refracting optical element, paths followed by light entering the optical system, and how to change the observation state in the optical system of this embodiment are substantially the same as those in the optical system of Embodiment 1, members having substantially same configurations are labeled with same symbols and detailed explanations on these are omitted.

Figure 9A:
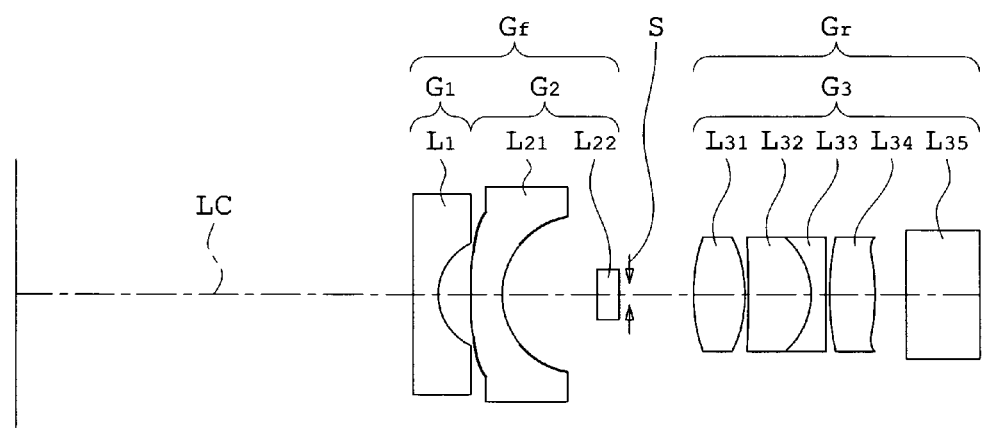
FIGS. 9A and 9B are sectional views taken along the optical axis that show the configuration of the optical system according to Embodiment 2, in a state where simultaneous observation of a front-direction object and a substantially-lateral-direction object is made and in a state where close-up enlarged view observation of the front-direction object is made, respectively.
Figure 9B:
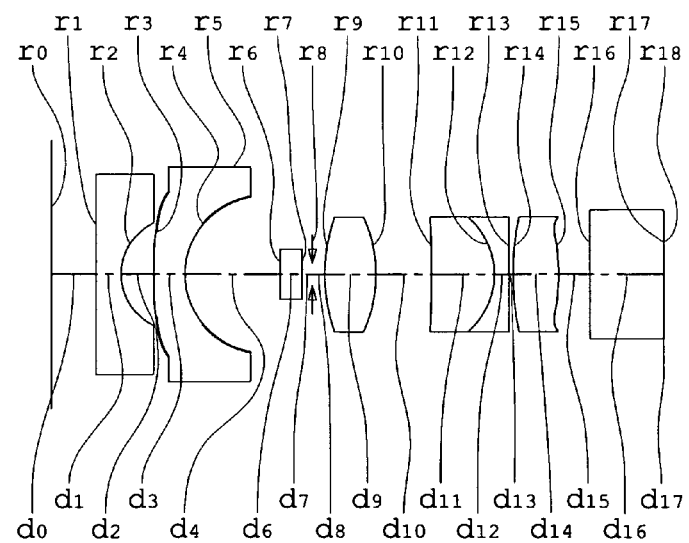
Figure 10A:
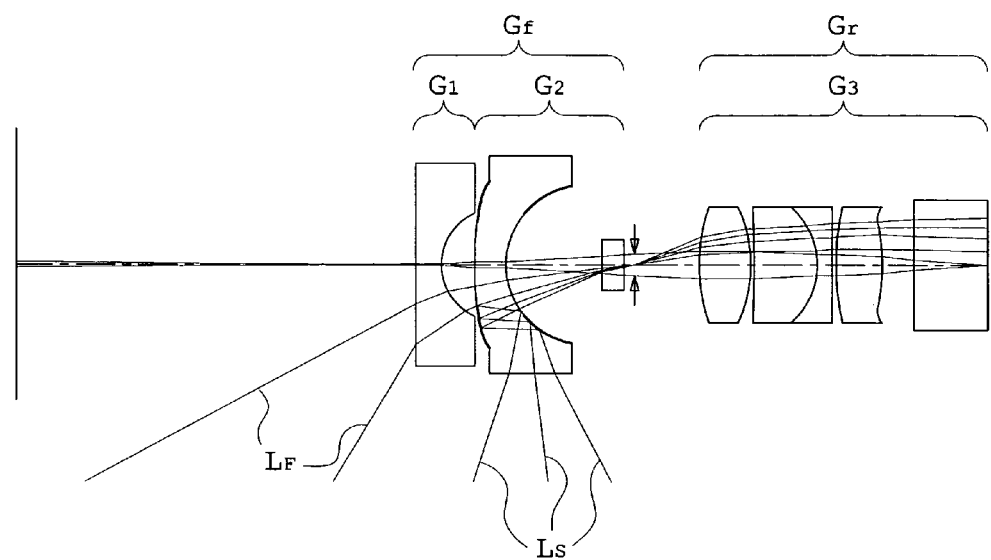
FIGS. 10A and 10B are sectional views taken along the optical axis that show the configuration and path of rays of the optical system according to Embodiment 2, in the state where simultaneous observation of the front-direction object and the substantially-lateral-direction object is made and in the state where close-up enlarged view observation of the front-direction object is made, respectively.
Figure 10B:
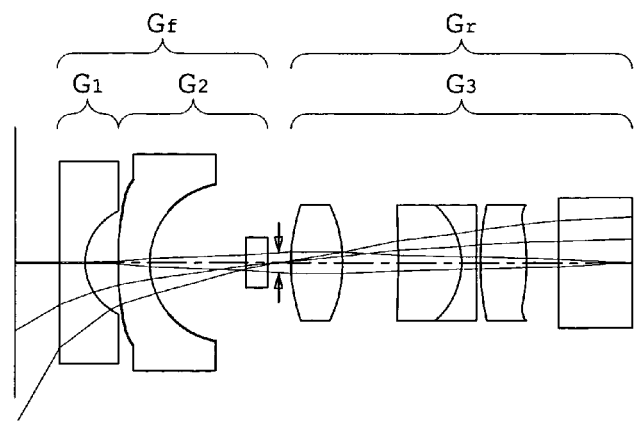
Figure 11A:
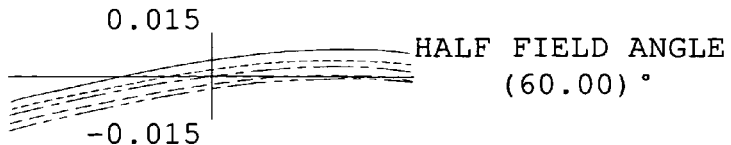
FIGS. 11A-11E and FIGS. 11F-11J are aberration diagrams of the optical system of Embodiment 2 in the state where simultaneous observation of the front-direction object and the substantially-lateral-direction object is made, for rays travelling from the front-direction-object side toward the image pickup surface, specifically showing coma on the meridional plane at the half-field angles of 60°, 45°, 30°, 15° and 0°, and coma on the sagittal plane at the half-field angles of 60°, 45°, 30°, 15° and 0°, respectively.
Figure 11B:
Figure 11C:
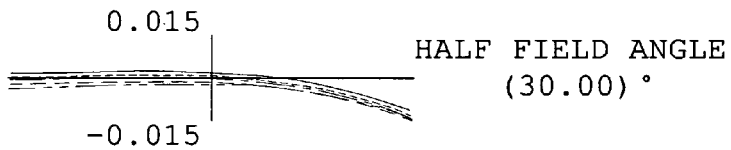
Figure 11D:
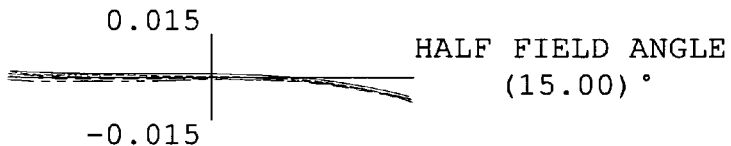
Figure 11E:
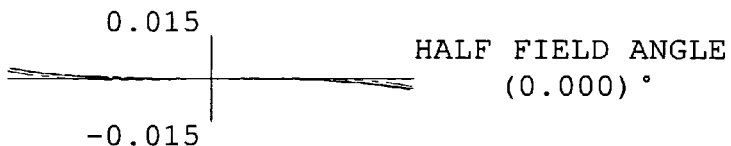
Figure 11F:
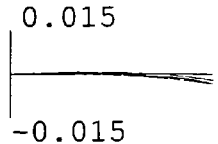
Figure 11G:
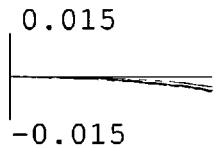
Figure 11H:
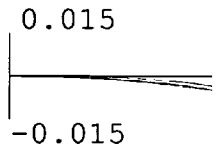
Figure 11I:
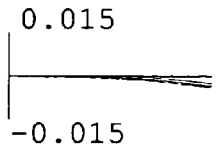
Figure 11J:
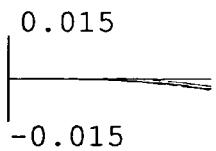
Figure 12A:
FIGS. 12A-12E and FIGS. 12F-12J are aberration diagrams of the optical system of Embodiment 2 in the state where simultaneous observation of the front-direction object and the substantially-lateral-direction object is made, for rays travelling from the substantially-lateral-direction-object side toward the image pickup surface, specifically showing coma on the meridional plane at the half-field angles of 115°, 105°, 95°, 85° and 75°, and coma on the sagittal plane at the half-field angles of 115°, 105°, 95°, 85° and 75°, respectively.
Figure 12B:
Figure 12C:
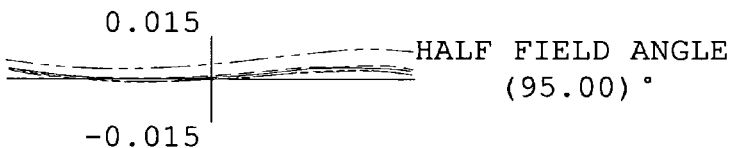
Figure 12D:
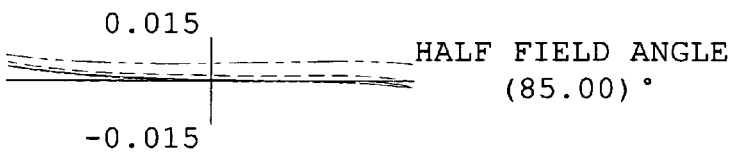
Figure 12E:
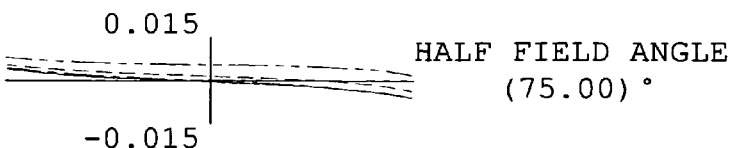
Figure 12F:
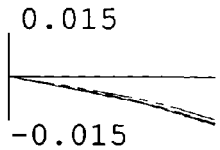
Figure 12G:
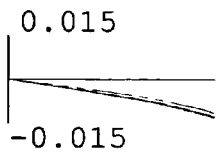
Figure 12H:
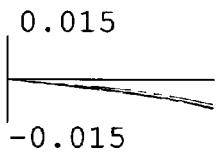
Figure 12I:
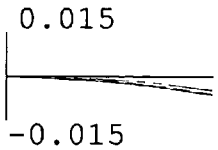
Figure 12J:
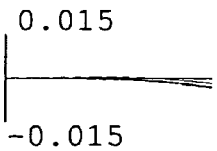
Figure 13A:
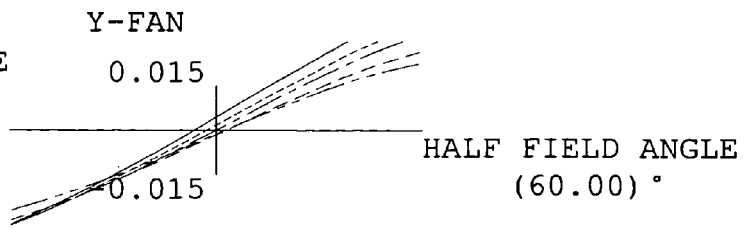
FIGS. 13A-13E and FIGS. 13F-13J are aberration diagrams of the optical system of Embodiment 2 in the state where close-up enlarged view observation of the front-direction object is made, for rays travelling from the front-direction-object side toward the image pickup surface, specifically showing coma on the meridional plane at the half-field angles of 60°, 45°, 30°, 15° and 0°, and coma on the sagittal plane at the half-field angles of 60°, 45°, 30°, 15° and 0°, respectively.
Figure 13B:
Figure 13C:
Figure 13D:
Figure 13E:
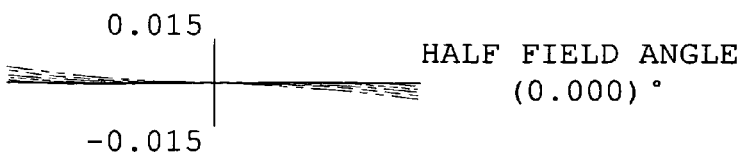
Figure 13F:
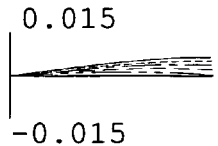
Figure 13G:
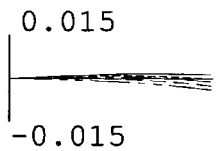
Figure 13H:
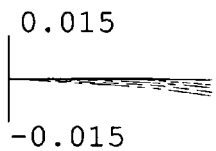
Figure 13I:
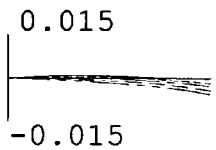
Figure 13J:
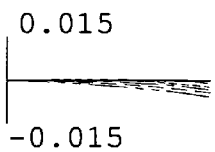

First, the configuration of the optical system of this embodiment is explained in reference to FIG. 9 and FIG. 10.

In the optical system of this embodiment, a front group $G_f$ having a negative refracting power as a whole, an aperture stop S, and a rear group $G_r$ having a positive refracting power as a whole are arranged on an optical axis LC of light from the front-direction-object side, in order from the front-direction-object side.

The front group $G_f$ is composed of, in order from the front-direction-object side, a first lens unit $G_1$ and a second lens unit $G_2$.

The rear group $G_r$ is composed of a third lens unit $G_3$.

The first lens unit $G_1$ is composed of a lens $L_1$ that is a plano-concave lens with the concave surface thereof being directed toward the image side.

The second lens unit $G_2$ includes, in order from the front-direction-object side, a lens $L_{21}$ that is a reflecting/refracting optical element with the front-direction-object-side surface thereof being aspherical and a lens $L_{22}$ that is a planar lens.

The aperture stop S is arranged on the image side of the lens $L_{22}$.

The third lens unit $G_3$ includes, in order from the front-direction-object side, a lens $L_{31}$ that is a biconvex lens movable along the optical axis, a lens $L_{32}$ that is a positive meniscus lens with the convex surface thereof being directed toward the image side, a lens $L_{33}$ that is a biconcave lens, a lens $L_{34}$ that is a biconvex lens with the image-side surface thereof being aspherical, and a lens $L_{35}$ that is a planar lens. The image-side surface of the lens $L_{32}$ and the object-side surface of the lens $L_{33}$ are cemented together.

The shapes of the lenses as referred to are those in the neighborhood of the optical axis of light from the front-direction-object side.

The configuration and numerical data are shown below regarding lenses constituting the optical system according to this embodiment.

Numerical data 2
unit: mm

Surface data

| surface number s | radius of curvature r | surface separation d | refractive index nd | Abbe's number vd |
|---|---|---|---|---|
| 0 | (object surface) | D0 | | |
| 1 | ∞ | 0.7 | 1.5163 | 64.1 |
| 2 | 1.58699 | 0.9 | | |
| 3 | (aspherical surface) 114.08067 | 0.85 | 1.5163 | 64.1 |
| 4 | 2.2 | 2.6138 | | |
| 5 | 3 | 3 | | |
| 6 | ∞ | 0.6 | 1.8830 | 40.8 |
| 7 | ∞ | 0.287 | | |
| 8 | (aperture stop) ∞ | D8 | | |
| 9 | 5.00915 | 1.4 | 1.7725 | 49.6 |
| 10 | −3.89454 | D10 | | |
| 11 | −23.93361 | 1.7 | 1.7292 | 54.7 |
| 12 | −2.15 | 0.4 | 1.8467 | 23.8 |
| 13 | 10781.23595 | 0.1 | | |
| 14 | 7.53056 | 1.25 | 1.5163 | 64.1 |
| 15 | (aspherical surface) −3.46941 | 0.85 | | |
| 16 | ∞ | 2 | 1.5163 | 64.1 |
| 17 | ∞ | 0 | | |
| 18 | (image surface) | | | |

It is noted that the radius of curvature for the surface number 5 is a radius of curvature of the third face $L_{21}c$ of the lens $L_{21}$, that is, the cylindrical surface around the optical axis, and the surface separation for the surface number 5 is a distance from the optical axis to the surface number 5.

Aspherical data

| surface number s | radius of curvature r | conic constant k | aspherical coefficients | | | |
|---|---|---|---|---|---|---|
| | | | $A_4$ | $A_6$ | $A_8$ | $A_{10}$ |
| 3 | 114.08067 | 0 | 2.08E−02 | −4.13E−03 | −5.76E−05 | −3.53E−05 |
| 15 | −3.46941 | 0 | 2.45E−02 | 5.44E−03 | 9.28E−03 | −1.55E−03 |

Various data

F number: 5.3
entire lens length: 15.5 mm
back focal distance: 0 mm
image height: 1.3 mm surface separation

| | simultaneous observation | close-up enlarged view observation |
|---|---|---|
| D0 | 10.828 | 1.206 |
| D8 | 1.749 | 0.339 |
| D10 | 0.1 | 1.510 | moving distance of moving lens component $L_{31}$: 1.410 mm
half-field angle
  for front-direction-object side
    common to simultaneous observation mode and
    close-up enlarged view observation mode: 60°
  for substantially-lateral-direction-object side (minimum angle~maximum angle)
    simultaneous observation mode: 72°~118°
    close-up enlarged view observation mode: not measurable
focal length
  focal length of entire system for front-direction-object side
    simultaneous observation mode: 0.754 mm
    close-up enlarged view observation mode: 1.154 mm
  focal length of first lens unit $G_1$
    common to simultaneous observation mode and
    close-up enlarged view observation mode: −3.062 mm
  focal length of second lens unit $G_2$ for front-direction-object side
    common to simultaneous observation mode and
    close-up enlarged view observation mode: −4.340 mm
  composite focal length of first lens unit $G_1$ and second lens unit
    common to simultaneous observation mode and
    close-up enlarged view observation mode: −1.497 mm
  focal length of third lens unit $G_3$
    simultaneous observation mode ($f_{r\_w}$): 2.978 mm
    close-up enlarged view observation mode ($f_{r\_c}$): 3.740 mm
  focal length of moving lens component $L_{31}$ ($f_m$)
    common to simultaneous observation mode and
    close-up enlarged view observation mode: 3.031 mm
Data Regarding Numerical Condition $$f_{r\_c}/f_{r\_w}=1.256$$

In the descriptions of the embodiments above, the close-up enlarged view observation is referred to only with respect to the front-direction object. However, the optical system may be configured to achieve close-up enlarged view observation of a substantially-lateral-direction object.

Further, the optical system may be provided with a moving lens other than the moving lens component described in each of the embodiments above, for varying the magnification with respect to the image of the front-direction object formed in the observation region by moving this moving lens.

In each of the above-described embodiments, for close-up enlarged view observation, the moving lens component is moved up to a position where an image of the substantially-lateral-direction object is scarcely formed. However, the moving lens component may be moved to a position that allows an image of the substantially-lateral-direction object to be formed to some extent in the entire observation region in close-up enlarged view observation also. In other words, although each of the above-described embodiments shows only the two extreme states of the optical system, or the state for simultaneous observation of a front-direction object and a substantially-lateral-direction object and the state for close-up enlarged view observation of the front-direction object, the optical system may be used with the moving lens component being positioned for an intermediate state between these extreme states, as a matter of course.

In the above-described embodiments, there is no mention of focusing in the state for simultaneous observation of the front-direction object and the substantially-lateral-direction object or in the state for close-up enlarged view observation of the front-direction object. Focusing may be made, for example, by moving the moving lens component to an extent as not to greatly change the refracting power balance between the front group and the rear group.

Regarding lenses constituting an optical system of the present invention, shapes and numbers are not limited to those disclosed in the above-described embodiments. Various optical systems including reflecting/refracting optical elements also are in the scope.

Although not arranged in the above-described embodiments, an image sensor may be arranged on the image side of the optical system. Further, a lowpass filter treated with IR cutoff coating, a CCD cover glass and the like may be arranged between the optical system and this image sensor.

While each of the optical systems is composed of three lens units in the above-described embodiments, an optical system of the present invention is not limited to these examples, but may be composed of two lens units or more than four lens units.

In the above-described embodiments, the third face of the reflecting/refracting optical element is shaped such that its front-direction-object-side diameter substantially coincides with its image-side diameter. However, those shaped to have the image-side diameter larger than the front-direction-object-side diameter or to have the image-side diameter smaller than the front-direction-object-side diameter may be used. The front-direction-object-side diameter is defined as a diameter measured at the most front-direction-object-side position of the third face in a plane perpendicular to the optical axis, and the image-side diameter is defined as a diameter measured at the most image-side position of the third face in a plane perpendicular to the optical axis. Further, while the third face of the reflecting/refracting optical element is formed between the first face and the second face over the entire circumferential face in the above-described embodiments, it is not always necessary to be formed over the entire circumferential face, but may be formed as a transmitting surface only in a partial region of the circumferential face.

Further, in each of the above-described embodiments, the first reflecting surface and the second reflecting surface are formed by deposition. However, forming method is not limited to this.

What is claimed is:

1. An optical system for observation of a front-direction object and a substantially-lateral-direction object, the optical system comprising, in order from a front-direction-object side:
    a front group with a negative refracting power having a reflecting/refracting optical element;
    an aperture stop; and
    a rear group with a positive refracting power having a moving lens component that is movable along an optical axis;
    wherein the reflecting/refracting optical element has:
        a first face that is formed on the front-direction-object side and that has a first transmitting surface formed with the optical axis being at a center thereof and a first reflecting surface annularly formed around the first transmitting surface and directed toward an image side,
        a second face that is formed on the image side and that has a second transmitting surface formed with the optical axis being at a center thereof and a second reflecting surface annularly formed around the second transmitting surface and directed toward the front-direction-object side, and
        a third face formed as a transmitting surface between the first face and the second face, and
    wherein a movement of the moving lens component changes a refracting power ratio of the front group to the rear group, to enlarge or shrink, in an observation region, a region in which an image of the front-direction object is formed.

2. An optical system according to claim 1, wherein the moving lens component has a positive refracting power.

3. An optical system according to claim 1, wherein, in the rear group, a lens component closest to the aperture stop is the moving lens component.

4. An optical system according to claim 1, wherein the front group includes a first lens unit with a negative refracting power and a second lens unit, wherein the rear group includes a third lens unit with a positive refracting power, wherein the first lens unit, the second lens unit, the aperture stop and the third lens unit form a first optical system for observation of the front-direction object, and wherein the second lens unit, the aperture stop and the third lens unit form a second optical system for observation of the substantially-lateral-direction object.

5. An optical system according to claim 1, wherein light from the front-direction-object side, after being incident on the first transmitting surface, is made emergent toward the image side from the second transmitting surface, and wherein light from the substantially-lateral-direction-object side, after being incident on the third face, is sequentially reflected at the second reflecting surface and the first reflecting surface and is made emergent toward the image side from the second transmitting surface.

6. An optical system according to claim 1, wherein the following condition is satisfied:

$$1.05 < f_{r\_c}/f_{r\_w} < 1.45$$

where $f_{r\_w}$ is a focal length of the rear group in a state where simultaneous observation of the front-direction object and the substantially-lateral-direction object is made, and $f_{r\_c}$ is a focal length of the rear group in a state where the region in which the image of the front-direction object is formed in the observation region is enlarged and observed.

* * * * *